Jan. 28, 1958        J. DAVIS        2,821,202

DENTAL CORD

Filed June 20, 1955

INVENTOR.
Jerome Davis

United States Patent Office 2,821,202
Patented Jan. 28, 1958

2,821,202

DENTAL CORD

Jerome Davis, West Haven, Conn.

Application June 20, 1955, Serial No. 516,630

2 Claims. (Cl. 132—93)

The present invention relates to dental cord, which is used in cleaning particles from between the teeth, and more specifically to dental cord composed of two substances or materials, one elastic and the other non-elastic.

The broad objective of the invention is to provide such a dental cord, with the two said materials so disposed as to facilitate the cleaning of the teeth crevices by virtue of the elasticity and pliability of one of the materials and the strength and stability of the other, which combination assures easy access to the teeth crevice and good cleaning power as well as insulation against cutting the gums.

The more specific objectives of the invention are as follows:

(1) To provide a dental cord that is composed of these said two materials so combined that said non-elastic material is at least partially covered by said elastic material, thus said elastic material affording insulation to said non-elastic material.

(2) To provide a dental cord which will stretch and reduce in size, or by virtue of its pliability reduce in size sufficiently to gain access to any normal teeth crevice and still retain the strength of the non-elastic material when pressure is applied in forcing said cord between the teeth or drawing it outwardly again.

(3) To provide a dental cord which will expand in size when once it has entered said crevice and thus better contact and clean the curvaceous surfaces of said teeth.

(4) To provide a dental cord which is formed by combining these two materials to accomplish said results in any of several ways which are: (a) to combine by coating a straight strand of non-elastic material with a surrounding layer of a pliable and elastic material, such as latex, (b) to combine by coating a spirally formed or crimped strand (or strands) of the non-elastic material with a surrounding layer of said pliable and elastic material, (c) to combine by winding or weaving about a central core of elastic material one or more strands of said non-elastic material, (d) to combine by both, either winding or weaving one or more strands of said non-elastic material about a core of elastic material and subsequently coating both with a layer of said elastic material thus embedding said wound, or woven strand or strands of non-elastic material in said elastic material, in a unitary cord.

Other objects and advantages of my invention will be apparent during the course of the following description.

In the accompanying drawings, forming a part of this application wherein, for the purpose of illustration, are shown a preferred and also modified embodiment of my invention.

Figure 1:
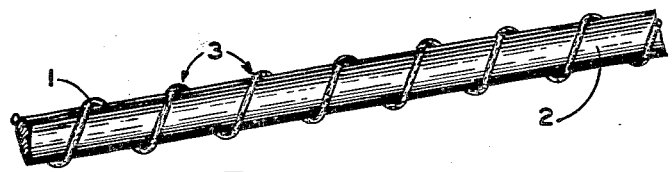
Figure 2:
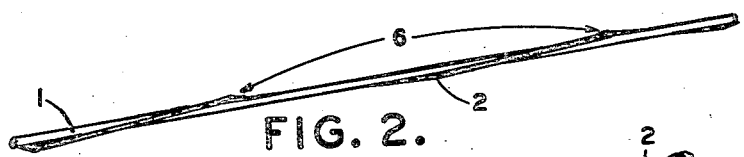
Figure 3:
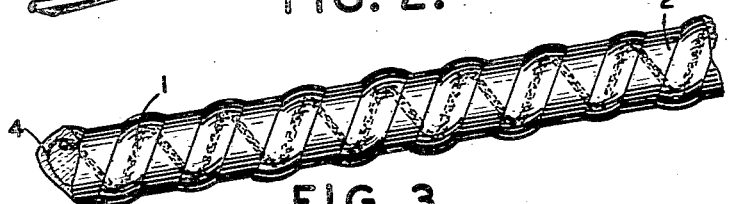
Figure 4:
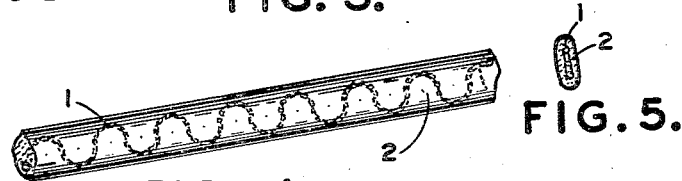
Figure 5:
Figure 6:
Figure 7:
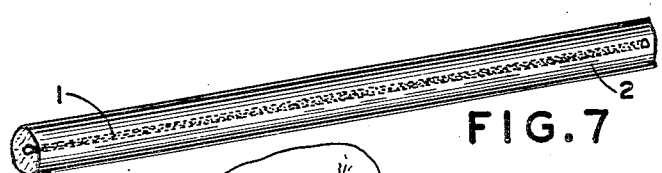
Figure 8:
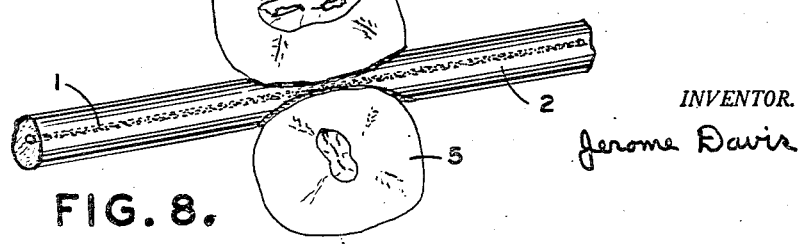

Fig. 1 is a greatly enlarged view of a dental cord having a central core of elastic and pliable material wound about by a strand of non-elastic material which allows that said dental cord can be stretched until said strand of non-elastic material is taut, Fig. 2 is a view of the cord of Fig. 1 with said cord stretched to its maximum, showing the disposition of the flexible core when the non-elastic material is taut, Fig. 3 is also a greatly enlarged view of a dental cord similar to Fig. 1 but having been covered by an additional layer of elastic material, thus embedding said strand of non-elastic material in said elastic material, said dental cord can also be stretched until said strand of non-elastic material is taut, Fig. 4 is also a greatly enlarged view of a modified form of my invention showing a dental cord consisting of a greatly crimped strand or cord of non-elastic material embedded within said elastic material, so disposed that said dental cord can be stretched until said embedded strand is taut, Fig. 5 is a cross section of one form of Fig. 4 in which said elastic material is flattened, to facilitate its gaining access to teeth crevices, Fig. 6 is a view of the cord of Fig. 4 when said cord is stretched to its limit showing the disposition of the two materials, Fig. 7 is likewise a greatly enlarged view of another modified form of my invention in which said dental cord is composed of a straight strand of non-elastic material covered with a substantial layer of elastic, pliable material, Fig. 8 is a view of the dental cord of Fig. 7 showing the flexing and displacement of the elastic, pliable coating when the cord is positioned between two teeth.

Referring to the drawings, Fig. 1 shows a preferred embodiment of my dental cord composed of a strand of non-elastic material 1 wound helically about the larger core of the elastic material 2, the pitch of the helical curve 3 being such that when the strand of non-elastic material is pulled taut the elastic material is stretched sufficiently to reduce said elastic material to convenient size for use, but still not allowing too extensive stretching and consequent breakage.

Fig. 2 shows the cord of Fig. 1 in its fully stretched condition, in which the strand of non-elastic material 1 assumes the straight position and said elastic material 2 is positioned in a long helical curve 6 thereabout, thus reversing their relative positions, when said strand of non-elastic material 1 is not pulled taut. Fig. 2 shows also that said elastic core 2 when in its stretched condition is well flattened and tightly wound about said non-elastic material, thus virtually assuming a unitary cord of convenient size to force in the crevice between the teeth, which, when thus inserted and then allowed to relax, all parts of the cord would reassume their original condition Fig. 1 as far as possible, thus filling said crevice and firmly pressing the teeth surfaces, which when said cord is drawn outwardly would be positively cleaned thereby.

Again in Fig. 3 another embodiment of my invention shows the helically wound non-elastic material 1 of Fig. 1 which has been subsequently coated with latex or other suitable material forming a uniform layer, thus binding said strand of non-elastic material to the elastic core thus creating a unitary cord with an internal helical thread of nonelastic material suspended therein, which when stretched virtually assumes the condition of being an elastic cord containing a straight thread of non-elastic material, which cord is very suitable for dental purposes.

Fig. 4 shows still another embodiment of my invention in which crimped strand 1 of said non-elastic material is imbedded in elastic material 2, which when stretched said crimped material assumes a straightened form internally situated in said elastic cord as shown in Fig. 6, which is also a convenient form for cleaning teeth crevices.

Fig. 5 is a cross section of one possible embodiment of Fig. 4 in which the elastic material is of a flattened form, Also in Fig. 7 still another embodiment of my invention shows a non-crimped and a non-spiralled strand of non-elastic material covered with an appropriate layer of elastic material which is sufficiently pliable to pass between normally placed teeth 5 without the need of stretching as is shown in Fig. 8.

The features of this dual structured dental cord herein set forth with one or more strands of the non-elastic material wound or woven about a core of elastic material with or without additional elastic coating; a crimped or spirally formed strand of non-elastic material imbedded in a cord of elastic material; and a straight strand of non-elastic material imbedded in a larger cord of elastic material are new and are applicable to these various embodiments of my invention shown or implied and constitute a substantial improvement in dental cord.

Such a cord can be manufactured on any conventional wire or thread covering machine and it will be noted that two or more such strands of such non-elastic material can be used and criss-crossed as they are applied to assure against unravelling and still not depart from the spirit or the scope of the subjoined claims.

Said dental cord can be wound on spools as at present and used as is the present dental floss, thus posing no new problems. Said dental cord has many advantages however, its nonelastic material is insulated with a softer layer of elastic and pliable material thus insuring against cutting the gums; its structure is such that it slips between the teeth much more readily by virtue of its presenting wet latex or some such material to the surface of wet teeth and also by virtue of its non-pliable cord being much smaller than is used at present; also it flexes sufficiently to enter the crevices, but when relaxed it completely fills said crevices and drags firmly on the curvaceous surfaces of the teeth when withdrawn, thus assuring far better cleansing. It is also very economical as an inch or two actually serves the purpose of six or more inches.

It is understood that the embodiments of my invention herewith shown and described are only examples of same and the various changes in form and arrangements of the two substances or materials may be resorted to, without departing from the spirit of my invention, or the scope of the subjoined claims.

I claim:

1. A cord consisting of two materials, one elastic and the other non-elastic, said non-elastic material consisting of at least one strand, and being positioned in a helical spiral imbedded within said elastic material.

2. A cord consisting of two materials, one elastic, the other non-elastic, said non-elastic material being disposed in at least one strand helically positioned within and covered by said elastic material, said non-elastic material extending in its helical spiral lengthwise in said cord, the helical pitch determining the ratio and establishing the limit of the stretch thereof.

References Cited in the file of this patent

UNITED STATES PATENTS

| | | |
|---|---|---|
| 1,149,376 | Leonard et al. | Aug. 10, 1915 |
| 1,575,317 | Carmichael | Mar. 2, 1926 |
| 2,231,808 | Isaac | Feb. 11, 1941 |
| 2,254,712 | Shepherd | Sept. 2, 1941 |
| 2,263,614 | Cote | Nov. 25, 1941 |
| 2,522,794 | Medof | Sept. 19, 1950 |